(12) United States Patent
Nakashima

(10) Patent No.: US 6,202,410 B1
(45) Date of Patent: Mar. 20, 2001

(54) HYDRAULIC SYSTEM FOR FORKLIFT

(75) Inventor: Seiji Nakashima, Aichi-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/211,769

(22) Filed: Dec. 15, 1998

(30) Foreign Application Priority Data

Dec. 16, 1997 (JP) .................................................. 9-346709
Jun. 16, 1998 (JP) ................................................ 10-168733

(51) Int. Cl.[7] .................................................. F16D 31/02
(52) U.S. Cl. ........................................... 60/433; 91/437
(58) Field of Search ........................ 60/433, 434; 91/437

(56) References Cited

U.S. PATENT DOCUMENTS

| 5,201,380 | 4/1993 | Callahan . |
| 5,275,251 | 1/1994 | Thomsen et al. . |
| 5,542,490 | * 8/1996 | Kemshall et al. ................ 180/422 |

FOREIGN PATENT DOCUMENTS

| 0 283 803 A2 | 3/1987 | (EP) . |
| 0 607 888 A1 | 1/1993 | (EP) . |
| 0 534 332 A1 | 3/1993 | (EP) . |
| 9-263258 | * 7/1997 | (EP) . |

OTHER PUBLICATIONS

Patent Abstracts of Japan, Publication No. 63219479, Published Sep. 13, 1988.

* cited by examiner

*Primary Examiner*—Edward K. Look
*Assistant Examiner*—Thomas E. Lazo
(74) *Attorney, Agent, or Firm*—Morgan & Finnegan, L.L.P.

(57) ABSTRACT

A hydraulic system for a forklift includes a handle angle sensor for outputting a rotational angle signal indicative of a rotational angle of a handle, a wheel angle sensor for outputting a wheel angle signal indicative of a steering angle of wheels, and a controller. The controller calculates a rotation angular velocity of the handle based on the rotational angle signal from the handle angle sensor to discharge from the hydraulic pump the hydraulic fluid of a flow rate in conformity with this rotation angular velocity, and controls the flow rate of the hydraulic fluid supplied to the power steering cylinder based on the rotational angle signal from the handle angle sensor and the wheel angle signal from the wheel angle sensor to steer the wheels in conformity with the rotational angle of the handle.

5 Claims, 3 Drawing Sheets

HYDRAULIC SYSTEM FOR FORKLIFT

BACKGROUND OF THE INVENTION

1. Field of the Invention

The present invention relates to a hydraulic system for a forklift, which supplies hydraulic fluid to a power steering cylinder to steer wheels.

2. Description of the Related Art

A hydraulic system for a forklift is known, in which when a handle is rotatively operated, hydraulic fluid is supplied by a hydraulic pump to a power steering cylinder to steer wheels. Such a conventional hydraulic system has a torque sensor which outputs a signal corresponding to rotational torque when the handle is rotatively operated, a handle angle sensor which outputs a signal corresponding to a handle rotation angle, and a wheel angle sensor which outputs a signal corresponding to a steering angle of the wheels. The hydraulic fluid of a flow rate based on the signal from the torque sensor is discharged from the hydraulic pump to effect the power steering while a solenoid valve is driven based on the signals from the handle angle sensor and the wheel angle sensor to control the steering angle of the wheels in conformity with the handle angle.

The conventional hydraulic system for the forklift suffers from a complicated and expensive sensor mechanism in the handle portion since the torque sensor for outputting the signal corresponding to the rotational torque on the handle and the handle angle sensor for outputting the signal corresponding to the handle rotation angle must be installed on the handle portion.

SUMMARY OF THE INVENTION

An object of the present invention is to provide a hydraulic system for a forklift, in which a sensor mechanism on a handle portion is made simple.

In order to solve the problem, a hydraulic system for a forklift according to the present invention is a system in which hydraulic fluid is supplied from a hydraulic pump to a power steering cylinder for steering wheels in accordance with rotational operation of a handle, the system comprising: a handle angle sensor for outputting a rotational angle signal indicative of a rotational angle of a handle; a wheel angle sensor for outputting a wheel angle signal indicative of a steering angle of wheels; and a controller for calculating a rotation angular velocity of the handle based on the rotational angle signal from the handle angle sensor to discharge hydraulic fluid of a flow rate in conformity with the calculated rotation angular velocity from a hydraulic pump, and controlling the flow rate of the hydraulic fluid to be supplied to a power steering cylinder based on the rotational angle signal from the handle angle sensor and the wheel angle signal from the wheel angle sensor to steer the wheels in conformity with the rotational angle of the handle.

When the handle is rotated, the rotation angular velocity of the handle is calculated based on the rotational angle signal output from the handle angle sensor, and the hydraulic fluid of the flow rate corresponding to this rotational angle velocity is discharged from the hydraulic pump. The flow rate of the hydraulic fluid to be supplied to the power steering cylinder is controlled based on the rotational angle signal and the wheel angle signal, so that the wheels are steered in conformity with the rotational angle of the handle.

DETAILED DESCRIPTION OF THE PREFERRED EMBODIMENTS

Figure 1:
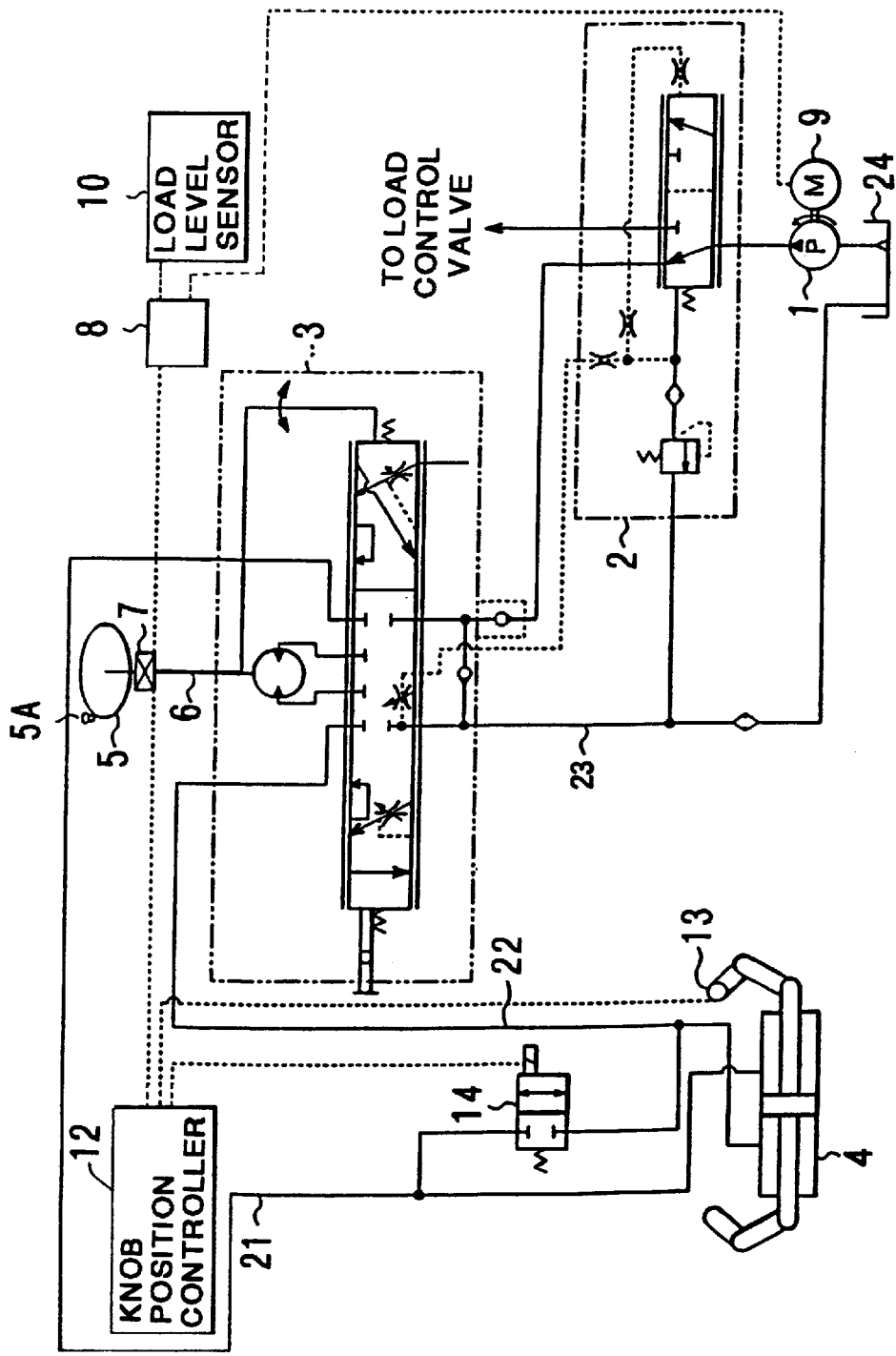
FIG. 1 is a block diagram showing a hydraulic system for a forklift according to a first embodiment of the present invention.

First Embodiment:

As shown in FIG. 1, a hydraulic system for a forklift according to a first embodiment is designed such that hydraulic fluid supplied from a hydraulic pump 1 is supplied from a priority valve 2 to a power steering cylinder (a PS cylinder) 4 through a steering valve 3 to power-steer the wheels in conformity with the rotational operation of a handle 5 while the hydraulic fluid is supplied from the priority valve 2 to a load cylinder (not shown) through a load control valve (not shown) to drive a loading equipment such as a fork.

The priority valve 2 and the steering valve 3 are generally used in combination with each other. The arrangement and effect of a combined use system thereof are described in Japanese Patent No. 797308 in detail. This combined use system is designed to commonly supply the hydraulic fluid by one hydraulic pump 1 to both the power steering cylinder 4 and another actuator (the not-shown load cylinder in this embodiment). In this embodiment, a hydraulic circuit is constructed to supply the hydraulic fluid to the power steering valve 3 driving the power steering cylinder 4 with priority.

The steering valve 3 functions so that when the handle 5 is rotatively operated, for example, clockwise, a spool (not shown) is moved rightward in the drawing to open a right handed side valve. Therefore, the hydraulic fluid from the priority valve 2 flows through a pipe 21 into a right chamber of the power steering cylinder 4 to steer the wheels rightward.

Conversely, when the handle 5 is rotated counterclockwise, the not shown spool in the steering valve 3 is moved leftward in the drawing to open a left handed side valve. Therefore, the hydraulic fluid from the priority valve 2 flows through a pipe 22 into a left chamber of the power steering cylinder 4 to steer the wheels leftward.

A rotation type handle angle sensor 7 is provided on a shaft portion 6 of the handle 5. This handle angle sensor 7 outputs such pulses as shown in FIG. 2 when the handle 5 is rotated from a neutral position clockwise or counterclockwise.

Figure 2:
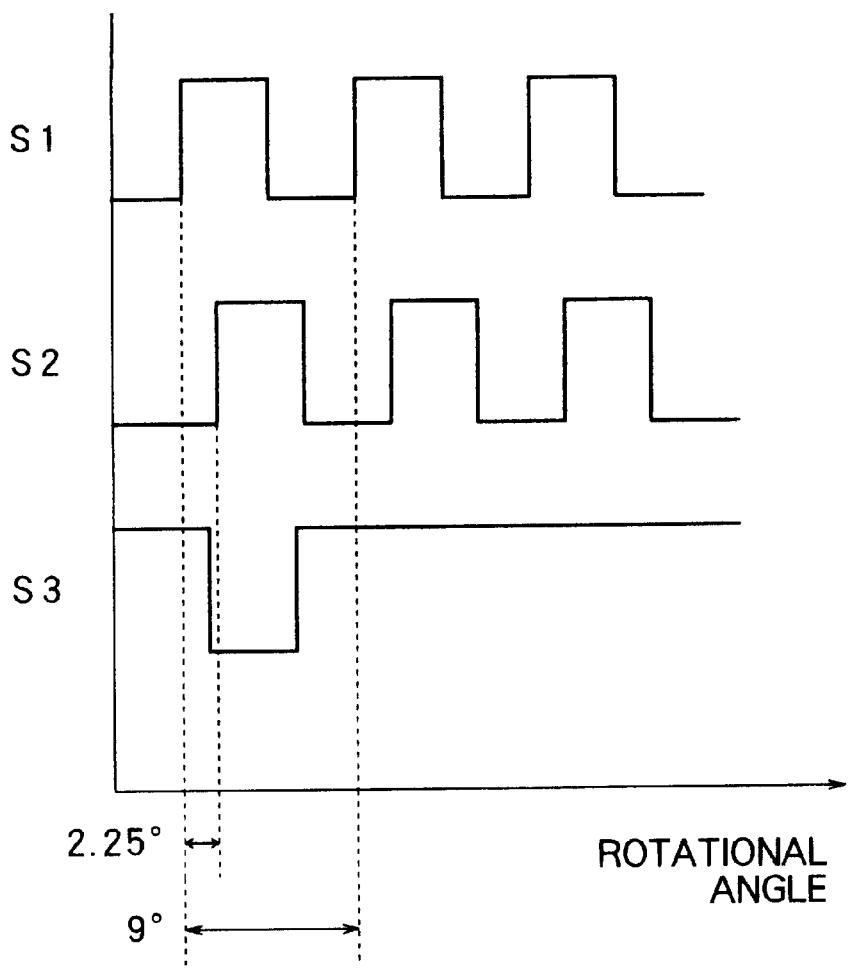
FIG. 2 shows a waveform of output signals from a handle angle sensor.

FIG. 2 shows a waveform of the output signals S1, S2 and S3 from the handle angle sensor 7. Each of the signals S1 and S2 is a pulse signal which is output every time when the handle 5 is rotated 9 degrees. The signals Si and S2 are so set that a phase differential of 2.25 degrees (a phase differential of ¼ cycle) is secured therebetween. This makes it possible, for example, to recognize the clockwise rotation of the handle 5 when the signal S1 is output prior to the signal S2 as well as the counterclockwise rotation of the handle 5 when the signal S2 is output prior to the signal S1. The signal S3 is a signal which is output every time when the handle 5 is rotated one turn in either of clockwise and counterclockwise. In addition, the signal S3 is recognized by a knob position controller 12 (described later) as the original position signal indicative of a state in which a knob 5A of the handle 5 is in the neutral position when the knob position controller 12 receives the signal S3 while receiving a signal indicative of a wheel steering angle of zero from a wheel angle sensor 13 (described later).

The handle angle sensor 7 is electrically connected to a main controller 8 and the knob position controller 12 so as to input the signals S1, S2 and S2 into the main controller 8 and the knob position controller 12. The main controller 8 counts the number of input pulses of the signal S1 or S2 to calculate a rotation angular velocity of the handle 5 based on the counted number of the pulses input during a predetermined time period.

The knob position controller 12 counts the number of input pulses of the signal S1 or S2 to calculate a rotation angle of the handle 5 with respect to the neutral position as well as detect the rotational direction.

The main controller 8 is electrically connected to a motor 9 for operating the hydraulic pump 1 to control the voltage supplied to the motor 9 in accordance with the rotation angular velocity of the handle 5, thereby variably controlling the flow rate of the hydraulic fluid supplied from the hydraulic pump 1.

The main controller 8 is also electrically connected to a load lever sensor 10 which detects an operation amount of a load lever for operating the loading equipment. When a signal corresponding to the operation amount of the load lever is input from the load lever sensor 10, the main controller 8 controls the voltage supplied to the motor 9 to variably control the hydraulic pump 1 so as to supply the hydraulic fluid of the flow rate required for the load.

The knob position controller 12 calculates a deviation between the rotation angle of the handle 5 from the neutral position obtained on the basis of the output signals S1, S2 and S3 from the handle angle sensor 7 and the steering angle of wheels obtained on the basis of a signal from the wheel angle sensor 13 attached to a king pin or the like on a rear axle, and controls the solenoid valve 14 to converge the deviation into zero.

As shown in FIG. 1, the solenoid valve 14 serves to bypass the hydraulic fluid to be supplied to the power steering cylinder 4 so that the steering angle of the wheels corresponds to the rotation angle of the handle 5.

In the thus constructed hydraulic system for the forklift, when the handle 5 is rotated, for example, clockwise, the shaft portion 6 of the handle 5 is rotated and the spool (not shown) of the steering valve 3 is moved in the rightward direction. The signals from the handle angle sensor 7 are input into the main controller 8 and the knob position controller 12.

As described above, by counting the number of input pulses of the signal S1 or S2, the main controller 8 calculates the rotation angular velocity of the handle 5 based on the counted number of the pulses input during a predetermined time period. In accordance with the rotation angular velocity of the handle 5, the motor 9 is variably controlled in speed so that the hydraulic pump 1 discharges the hydraulic fluid of the flow rate corresponding to the rotational angular velocity of the handle 5.

By counting the number of input pulses of the signal S1 or S2, the knob position controller 12 calculates the rotational angle of the handle 5 from its neutral position and recognizes the rotational direction of the handle 5.

The hydraulic fluid discharged from the hydraulic pump 1 flows from the priority valve 2 to the steering valve 3, passes through a valve port depending on the position of the spool in the steering valve 3 into the pipe 21, and is then supplied to the right chamber of the power steering cylinder 4, whereas the hydraulic fluid in the left chamber of the power steering cylinder 4 passes through the pipe 22, the steering valve 3, the pipe 23 and so on to be returned to the tank 24. This flow of the hydraulic fluid drives the power steering cylinder 4 to steer the wheels in the rightward direction.

During the course of process to steer the wheels in the rightward direction as described above, the knob position controller 12 calculates the deviation between the rotational angle of the handle 5 from its neutral position and the wheel steering angle based on the signal from the wheel angle sensor 13 attached to the king pin or the like on the rear axle, and controls the solenoid valve 14 so as to converge the deviation into zero. In this control, the hydraulic fluid supplied to the right chamber of the power steering cylinder 4 is bypassed in accordance with the deviation, so that the steering angle of the wheels corresponds to the rotational angle of the handle 5.

In addition, when the handle is rotated counterclockwise, the hydraulic fluid is supplied to the left chamber of the power steering cylinder 4, and the hydraulic fluid in the right chamber of the power steering cylinder 4 is returned to the tank 24. Therefore, the power steering cylinder 4 steers the wheels in the leftward direction. Accordingly, in a case where the steering is only effected without driving the loading equipment, the flow rate of the hydraulic fluid discharged from the hydraulic pump 1 becomes in conformity with the rotation angular velocity of the handle 5.

When only the loading equipment is driven by operating the load lever, the main controller 8 rotationally controls the motor 9 so that the hydraulic pump 1 discharges the hydraulic fluid of the flow rate corresponding to the signal from the load lever sensor 10.

In a case where the steering and the loading are both effected simultaneously, the main controller 8 rotationally controls the motor 9 so that the hydraulic pump 1 discharges the hydraulic fluid of the flow rate required for both the steering and the loading. In a case where neither the steering nor the loading are effected, the motor 9 is not rotated so as to stop the hydraulic pump 1. Therefore, the electric power consumption by the motor 9 can be eliminated.

As described above, according to this hydraulic system for the forklift, the power steering for the wheels is possible by providing only the handle angle sensor 7 on a rotating mechanism section of the handle 5. Thus, the sensor mechanism on the handle portion can be made simple.

The hydraulic pump 1 is a commonly used type capable of supplying the hydraulic fluid of the flow rate required for both the steering and the loading. Therefore, the installation space for the hydraulic pump 1 can be reduced in comparison with a case in which two hydraulic pumps are provided respectively for the steering and the loading.

Although the main controller 8 and the knob position controller 12 are independently provided in the first embodiment, they may be integrated together as a single controller.

In place of the priority valve 2, a general flow-divider to vary the supply rate of the hydraulic fluid may be used.

Figure 3:
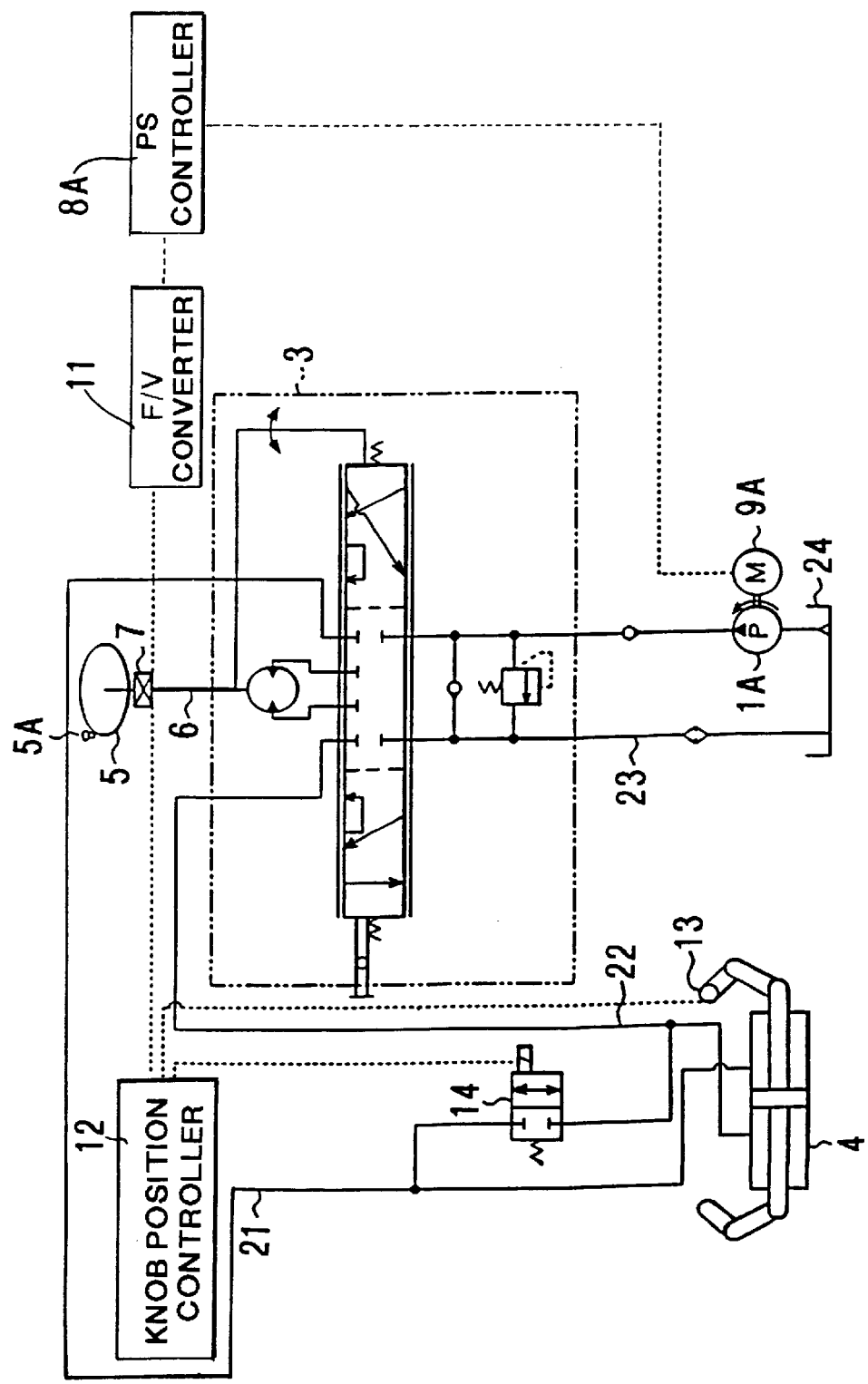
FIG. 3 is a block diagram showing a hydraulic system for a forklift according to a second embodiment.

Second Embodiment:

FIG. 3 is a hydraulic circuit diagram showing an arrangement of a hydraulic system for a forklift according to a second embodiment. In this hydraulic circuit diagram, components functionally equivalent to those in the hydraulic circuit of the first embodiment shown in FIG. 1 are denoted by the same reference numerals.

In contrast to the first embodiment in which the hydraulic pump 1 supplies the hydraulic fluid of the flow rate required for both the steering and the loading, a hydraulic pump 1A in the second embodiment supplies the hydraulic fluid required only for the steering.

As shown in FIG. 3, in this hydraulic circuit, the hydraulic fluid supplied from the hydraulic pump 1A is supplied to a power steering cylinder 4 through a steering valve 3 so as to power-steer wheels in conformity with the rotational operation of a handle 5.

In the steering valve 3, a spool (not shown in the drawing) is moved in accordance with the clockwise or counterclockwise operation of the handle 5 so as to form a flow passage for the hydraulic fluid flowing out from the hydraulic pump 1A.

As described in the first embodiment, a handle angle sensor 7 provided on a shaft portion 6 of the handle 5 outputs pulse signals S1 to S3 as shown in FIG. 2 when a knob of the handle 5 is rotated from the neutral position clockwise or counterclockwise.

As described in the first embodiment, each of the signals S1 and S2 shown in FIG. 2 is a pulse signal which is output every time when the handle 5 is rotated 9 degrees. The signals S1 and S2 are so set that a phase differential of 2.25 degrees (a phase differential of ¼ cycle) is secured therebetween. The signal S3 is the original position signal.

The handle angle sensor 7 is electrically connected to a PS controller 8A through a F/V converter 11 and to a knob position controller 12. The signals from the handle angle sensor 7 are converted by the F/V converter 11 into voltage signals corresponding to the frequency of the pulse signals, and then input into the PS controller 8A. The signals S1, S2 and S3 are directly input into the knob position controller 12. The PS controller 8A calculates a rotation angular velocity of the handle 5 based on the voltage signals converted from the frequency of the pulse signals by the F/V converter 11.

The knob position controller 12 counts the number of input pulses of the signal S1 or S2 to calculate a rotation angle with respect to the neutral position of the handle 5 as well as detect the rotational direction of the handle 5.

The PS controller 8A is electrically connected to a motor 9A for rotating the hydraulic pump 1A to variably control in speed the motor 9A in accordance with the rotation angular velocity of the handle 5, thereby controlling the flow rate of the hydraulic fluid supplied from the hydraulic pump 1A.

The knob position controller 12 calculates a deviation between the rotation angle of the handle 5 from its neutral position obtained on the basis of the output signals S1, S2 and S3 of the handle angle sensor 7, and the steering angle of wheels obtained on the basis of a signal from a wheel angle sensor 13 attached to a king pin or the like on a rear axle, and controls a solenoid valve 14 to converge the deviation into zero.

The solenoid valve 14 serves to bypass the hydraulic fluid to be supplied to the power steering cylinder 4 so that the steering angle of the wheels corresponds to the rotation angle of the handle 5.

In the thus constructed hydraulic system for the forklift, when the handle 5 is rotated, for example, clockwise, the shaft portion 6 of the handle 5 is rotated and the spool (not shown) of the steering valve 3 is moved.

As described above, the PS controller 8A calculates the rotation angular velocity of the handle 5 based on the pulse number of the signal S1 or S2 input from the handle angle sensor 7 during a predetermined time period. In accordance with the calculated rotation angular velocity of the handle 5, the motor 9A is variably controlled in speed by the PS controller 8A so that the hydraulic pump 1A discharges the hydraulic fluid of the flow rate corresponding to the rotation angular velocity of the handle 5.

Based on the signals S1, S2 and S3, the knob position controller 12 calculates the rotation angle of the handle 5 from its neutral position and detects the rotational direction of the handle 5.

The hydraulic fluid discharged from the hydraulic pump 1A flows into the steering valve 3, passes through a valve port depending on the position of the spool in the steering valve 3 into a pipe 21, and is then supplied to the right chamber of the power steering cylinder 4, whereas the hydraulic fluid in the left chamber of the power steering cylinder 4 passes through a pipe 22, the steering valve 3, a pipe 23 and so on and is returned to a tank 24. This flow of the hydraulic fluid drives the power steering cylinder 4 to steer the wheels in the rightward direction.

During the course of process to steer the wheels in the rightward direction as described above, the knob position controller 12 calculates the deviation between the rotational angle of the handle 5 from its neutral position and the wheel steering angle obtained on the basis of the signal from the wheel angle sensor 13 attached to the king pin or the like on the rear axle, and controls the solenoid valve 14 so as to converge the deviation into zero. In this control, the hydraulic fluid to be supplied to the right chamber of the power steering cylinder 4 is bypassed in accordance with the deviation, so that the steering angle of the wheels corresponds to the rotational angle of the handle 5.

In addition, when the handle is rotated counterclockwise, the hydraulic fluid is supplied to the left chamber of the power steering cylinder 4, and the hydraulic fluid in the right chamber of the power steering cylinder 4 is returned to the tank 24. Therefore, the power steering cylinder 4 steers the wheels in the leftward direction.

As described above, according to this hydraulic system for the forklift in the second embodiment, the power steering for the wheels is possible by providing only the handle angle sensor 7 on the rotating mechanism section of the handle 5 similarly to the first embodiment. Thus, the sensor mechanism on the handle portion can be made simple.

In contrast to the first embodiment, the hydraulic pump 1A is dedicated for only power steering, and thus the hydraulic passage can be made simple.

The stoppage of the motor 9A during the un-steering state can suppress the electric power consumption.

Although the PS controller 8A and the knob position controller 12 are independently provided, they may be integrated together as a single controller. Similarly to the first embodiment, the pulse signals from the handle angle sensor 7 may be directly input into the PS controller 8A for calculating the rotation angular velocity of the handle 5.

According to this invention, the hydraulic fluid to be supplied to the power steering cylinder is discharged from the hydraulic pump in accordance with the rotational angle signal output from the handle angle sensor to power-steer the wheels. Therefore, the sensor mechanism on the handle portion can be made simple.

If the hydraulic pump is stopped when the handle is not rotatively operated, the consumption of the electric power for driving the hydraulic pump can be suppressed.

When the hydraulic pump is commonly used for the power steering and the loading, the installation space for the hydraulic pump can be reduced in comparison with a case where two hydraulic pumps are provided respectively for the power-steering and the loading.

What is claimed is:

1. A hydraulic system for a forklift in which hydraulic fluid is supplied from a hydraulic pump to a power steering cylinder for steering wheels in accordance with rotational operation of a handle, said system comprising:

a handle angle sensor for outputting a rotational angle signal indicative of a rotational angle of a handle;

a wheel angle sensor for outputting a wheel angle signal indicative of a steering angle of wheels;

a steering valve connected between the hydraulic pump and the power steering cylinder;

a solenoid valve for bypassing the hydraulic fluid supplied to the power steering cylinder through said steering valve;

a main controller for calculating the rotation angular velocity of the handle based on the rotational angle signal from the handle angle sensor in a predetermined time period to control a discharge flow rate of the hydraulic pump; and a knob position controller for controlling said solenoid valve so as to converge into zero a deviation between a rotation angle of the handle from its neutral position obtained on the basis of the rotational angle signal and a wheel steering angle obtained on the basis of the wheel angle signal, said handle angle sensor outputting first and second pulse signals having a phase differential therebetween every time when the handle is rotated at a predetermined angle, and a third pulse signal when the handle is rotated one turn, said knob position controller detecting the neutral position of the handle based on the third pulse signal and the wheel angle signal from said wheel angle sensor, detecting a rotational direction of the handle based on the first and second pulse signals, and calculating a rotational angle of the handle from the neutral position.

2. A hydraulic system according to claim 1, wherein said main controller rotationally controls a motor for driving the hydraulic pump.

3. A hydraulic system according to claim 1, further comprising a priority valve for dividing the hydraulic fluid from the hydraulic pump into one for power steering and the other for loading.

4. A hydraulic system according to claim 3, further comprising a load lever sensor connected to said main controller for detecting the motion of a load lever used to operate the forklift to perform loading action, said main controller controlling the discharge flow rate of the hydraulic pump based on the rotation angular velocity of the handle calculated from the rotational angle signal and a detection signal from said load lever sensor.

5. A hydraulic system according to claim 1, wherein said main controller stops the hydraulic pump when the handle is not rotationally operated.

\* \* \* \* \*

UNITED STATES PATENT AND TRADEMARK OFFICE
CERTIFICATE OF CORRECTION

| | |
|---|---|
| PATENT NO. | : 6,202,410 B1 |
| DATED | : March 20, 2001 |
| INVENTOR(S) | : Seiji Nakashima |

It is certified that error appears in the above-identified patent and that said Letters Patent is hereby corrected as shown below:

<u>Column 2,</u>
Line 50, please change "The signals Si and S2" to -- The signals S1 and S2 --.

Signed and Sealed this

Thirtieth Day of April, 2002

Attest:

Attesting Officer

JAMES E. ROGAN
*Director of the United States Patent and Trademark Office*